July 19, 1960     O. B. PULSIFER     2,945,469

TRAWLING DEVICE

Filed Jan. 27, 1958     2 Sheets-Sheet 1

INVENTOR
ORVILLE B. PULSIFER,
By Fetherstonhaugh & Co.
ATTORNEYS.

July 19, 1960  O. B. PULSIFER  2,945,469
TRAWLING DEVICE
Filed Jan. 27, 1958   2 Sheets-Sheet 2
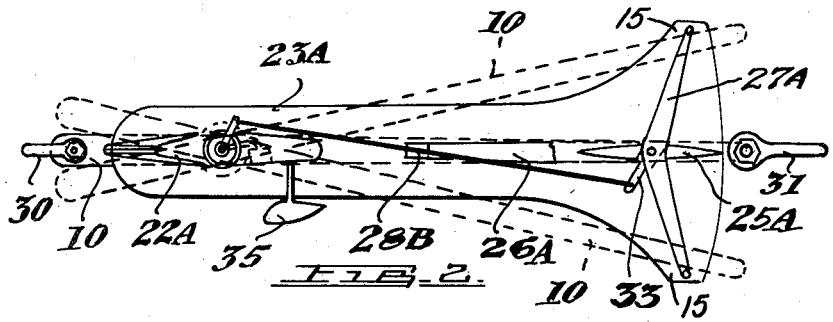
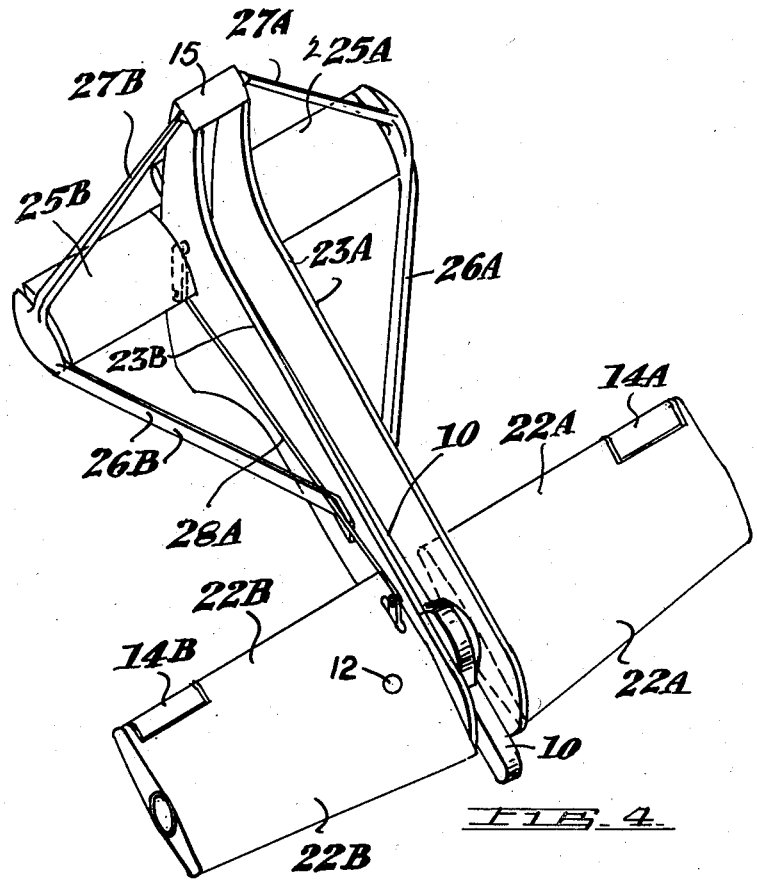
INVENTOR
ORVILLE B. PULSIFER
By Fetherstonhaugh & Co.
ATTORNEYS.

2,945,469
TRAWLING DEVICE

Orville B. Pulsifer, 207 Roy Bldg., P.O. Box 911, Halifax, Nova Scotia, Canada

Filed Jan. 27, 1958, Ser. No. 711,274

3 Claims. (Cl. 114—235)

This invention relates to a control device for automatically controlling the depth at which an object is towed in water and is concerned particularly with control of the depth at which a fishing net is trawled.

In the field of trawl fishing wherein nets are towed at a depth behind a trawling vessel there is a requirement to maintain the depth at which the nets are trawled constant and at a specified level. This requirement led to the development of many devices to lower the net to a specified depth and maintain it at that depth during the trawling operation. One such device is the trawling "otter" board which is mounted on the tow line and by means of a planing action tends to pull the net into the water. The otter board is dependent for its operation on the forward motion of the trawling vessel. Hence the more rapidly the trawling vessel moves, the deeper the net is sunk and conversely, if the trawler moves slowly, the net will tend to rise to the surface. The nets being trawled also have a variable buoyancy due to the contents, i.e., the accumulation of fish, etc., during the trawling operation which may modify the action of the otter board. An improvement on the otter board which is in common use is the addition of weights to the tow line as an aid in sinking the net. This arrangement also suffers from the disadvantage that the depth at which the net is trawled is dependent upon the forward speed of the trawling vessel.

Various types of adjustable planes have been attached to configurations of otter boards in order to control the depth at which the otter board operates. However, these devices have all either been of the preset kind wherein the relative angle which the variable planer makes with the forward motion of the otter board is fixed prior to placing the otter board in the water or else a device which is controlled from the trawling vessel by means of mechanical linkages. These adjustable elements in practice have not proved satisfactory since the pre-set trawling board with variable planes offers little, if any, improvement over the standard trawling otter board. The otter board which has variable vanes controlled from the trawling vessel requires complex mechanical linkages to control the setting of the plane and to indicate the depth at which the otter is being trawled. These mechanical linkages interfere with the operation of setting or reeling in the trawling nets. Otter boards in themselves are awkward to handle and difficult to launch or bring back into the trawling vessel.

The present invention overcomes the deficiencies of the prior devices used for regulating the depth of nets in trawl fishing by providing automatic control of the depth to which the net is lowered, the depth of trawling being independent of the forward velocity of the trawling vessel or variations in buoyancy of the net being trawled. The present invention is also convenient to handle and may be readily launched or returned to the trawling vessel.

According to the present invention a draw-bar is inserted between the trawling line from the trawling vessel and the tow line to the net. The draw-bar is rotatably attached to a set of main hydrofoils which in turn are rigidly attached to a body on the extremity of which are fixed a set of control hydrofoils. The setting of the control hydrofoils is controlled by a hydrostatic device which is preset for the desired trawling depth. When the present invention is launched it immediately assumes a position which tends to draw the net down to the desired depth. On reaching the desired depth, the control hydrofoils neutralize their position and operate to maintain the net at the desired depth. The hydrostatic control device is preset prior to launching of the mechanism and maintains the net at the specified depth during the entire trawl operation regardless of the buoyancy of the net. It may thus be seen that no external controls are required and that the depth to which the net is lowered is independent of the variation and forward motion of the trawler, variations in ocean currents, or buoyancy of the net.

In the drawings which illustrate embodiments of the invention,

Figure 2 is a side elevation of the apparatus,

Figure 4 is a perspective view of the apparatus according to the invention.

Figures 1, 3:
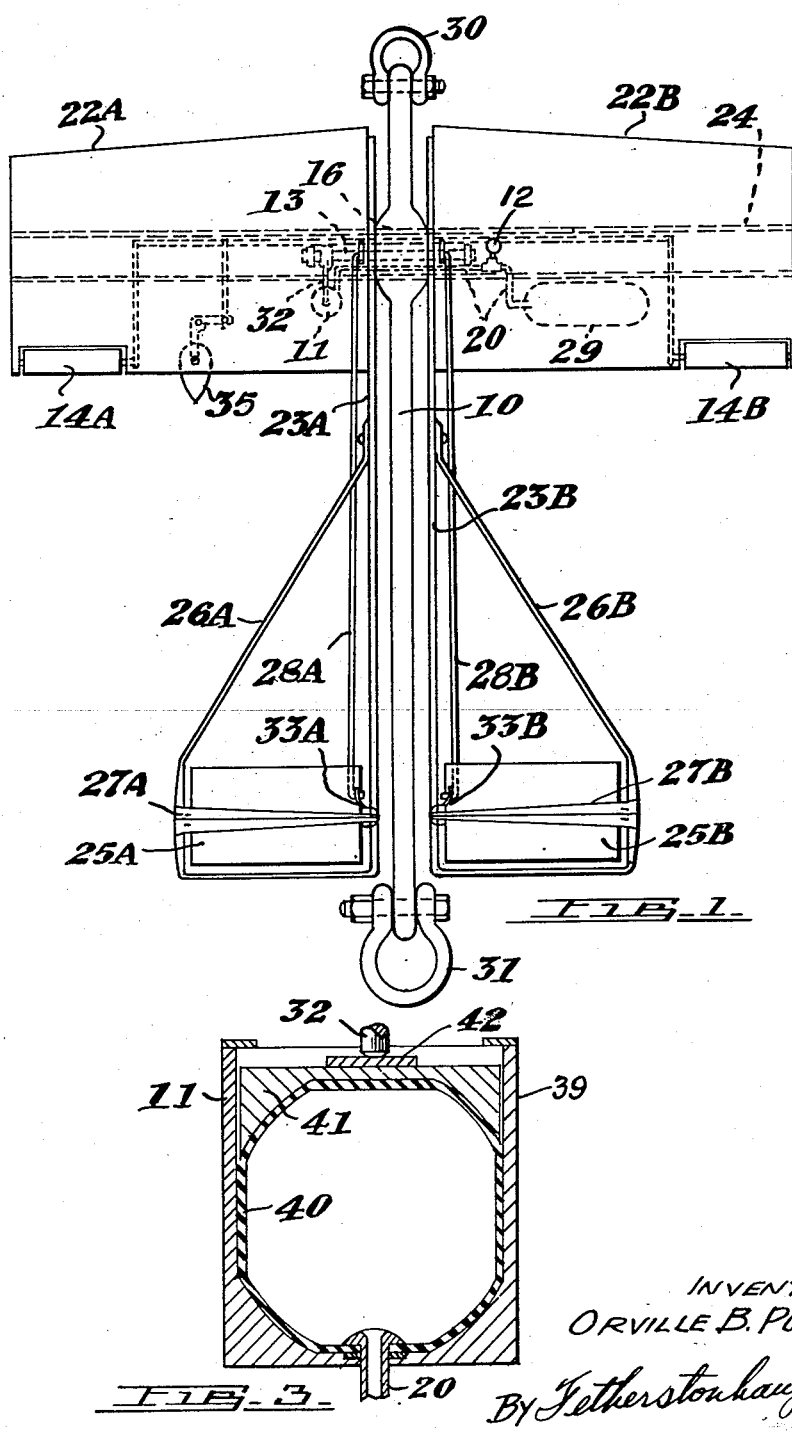
Figure 1 is a plan view of the apparatus according to the invention.
Figure 3 is a side elevation of the hydrostatic control element.

The embodiment of the invention illustrated in Figure 1 comprises a draw-bar 10 with a shackle 30 coupled to the forward end and a shackle 31 coupled to the rear end thereof, the shackle 30 provides connection to the trawl line of the trawling vessel and the shackle 31 provides connection to the tow line for the trawl net. Through the forward portion of the draw-bar 10 a nylon bearing 16 is fitted and inside this nylon bearing a tube 24 is fixed. Mounted to either end of this tube 24 are the main hydrofoils 22a and 22b. At the rear outer extremities of the main hydrofoil 22a, 22b are mounted horizontal stabilizers 14a and 14b respectively. Side body members 23a and 23b are fixed to main hydrofoils 22a and 22b respectively. At the rear extremity of horizontal side members 23a and 23b are attached control hydrofoils 25a and 25b respectively. Supporting rods 26a and 26b are fastened at their forward ends to side body members 23a and 23b respectively, and at their rear ends to support elements 27a and 27b respectively which in turn are fastened to the rear upper and lower portions of side body members 23a and 23b respectively.

Hydrostatic control cylinder 11 is mounted in the body of main hydrofoil 22a and is coupled by crank 32 to pivot rod 13. Control rods 28a and 28b are connected to cranks mounted on pivot rod 13 at one extremity and to cranks 33, 34 attached to elevator planes 25a and 25b at their other extremities.

Air balance tank 29 which is mounted in main hydrofoil 22b is connected via tubing 20 to hydrostatic cylinder 11. Depth gauge 12 is a pressure gauge calibrated in equivalent depth in fathoms.

Figure 2 is a side elevation of the present invention which illustrates the possible radius of action of the draw bar 10 with respect to the main body of the invention 23. Rubber stops 15 are fitted to the upper and lower rear extremities of body 23a and b to limit the motion of draw-bar 10. This limit of motion facilitates recovery and launching of the mechanism and enables the present invention to be readily raised from the water.

Static pendulum balance 35 which operates to maintain the main hydrofoils 22a and 22b level in the water is connected by means of linkages (not shown) to horizontal stabilizers 14a and 14b.

In operation the air balance tank 29 is filled with compressed air up to a pressure which will correspond to the depth to which the trawling device is to be lowered, this depth being indicated on the depth gauge 12. This air pressure is also transmitted to the cylinder 11 (Fig. 3) and inflates the rubber bladder 40 which exerts a force against piston 41. Spring loaded against pad 42 by a means not shown is crank arm 32 which is connected to element 13 (Fig. 1) by means of a crank. Control bar 28 is connected to element 13 at one end and at the other end to elevator hydrofoil 25 by means of another crank 33. When the trawl device is placed in the water the elevator plane assumes a position which tends to draw the mechanism downward until a depth is reached where the pressure acting on the top of the piston 41 is equal to the pressure in the bladder 40 and the piston 41 sinks into the cylinder 39. From Figure 2 it may be seen that as the piston descends into the cylinder 39, crank 32 is rotated clockwise, element 13 also rotates clockwise which causes bar 28 to be moved to the right and elevator plane 25a is returned to a neutral position. If the apparatus descends to a depth greater than that for which the device has been set, a further clockwise motion of crank 32 will result, causing plane 25a to be rotated anti-clockwise which will exert a force upon the main body of the invention to urge it to a shallower depth.

As previously mentioned, the present invention is unaffected by variations in buoyancy of the net being trawled. Additionally, the present invention gives improved operation with increase in speed of the trawling vessel, and will maintain depth more accurately with such an increase in speed.

What I claim as my invention is:

1. Apparatus for controlling the depth at which an object is towed in water, comprising a draw-bar adapted to connect between a tow cable and an object to be towed, a main frame pivotally connected to said draw-bar adjacent the end adapted to be connected to the tow cable and extending on either side of said draw-bar, a pair of main hydrofoils rigidly attached to said main frame adjacent the connection of said main frame to said draw-bar and extending outwardly from said frame on either side of said draw-bar, stabilizing means comprising roll control means mounted on the main hydrofoils and roll-deviation sensing means operatively connected to said control means for stabilizing the main hydrofoils in substantially horizontal planes during towing of the apparatus, a pair of elevator planes mounted on either side of said main frame at the end thereof remote from said main hydrofoils, and hydrostatic elevator control means operatively connected to said elevator planes and adapted to control said elevator planes thereby to control the depth at which said apparatus is towed.

2. Apparatus as claimed in claim 1, wherein said hydrostatic control means comprises a compressed air tank, a cylinder, a piston slidably fitted within said cylinder, one end of said cylinder being subject to pressure of the water in which said object is towed and the other end being subject to pressure from the compressed air tank, said piston being adapted to be responsive in its position within the cylinder to the differential in pressure between the two ends of the cylinder; and mechanical linkages connected to said piston and adapted to operate said elevator control planes.

3. Apparatus as claimed in claim 1, wherein said roll deviation sensing means comprises a pendulum responsive to deviations and said roll control means comprises a pair of horizontal stabilizer planes mounted near the extremities of said main hydrofoils, and linkage between said pendulum and horizontal stabilizer planes adapted to operate said horizontal stabilizer planes in response to movement of the pendulum to stabilize said apparatus.

References Cited in the file of this patent

UNITED STATES PATENTS

| | | |
|---|---|---|
| 1,358,360 | Burney | Nov. 9, 1920 |
| 2,729,910 | Fryklund | Jan. 10, 1956 |